United States Patent [19]

Lachowicz et al.

[11] 4,026,809

[45] May 31, 1977

[54] LUBRICATING COMPOSITIONS CONTAINING METHACRYLATE ESTER GRAFT COPOLYMERS AS USEFUL VISCOSITY INDEX IMPROVERS

[75] Inventors: Donald R. Lachowicz, Fishkill; Charles B. Holder, Wappingers Falls, both of N.Y.

[73] Assignee: Texaco Inc., New York, N.Y.

[22] Filed: Dec. 19, 1974

[21] Appl. No.: 534,539

[52] U.S. Cl. ............... 252/51.5 A; 252/51.5 R
[51] Int. Cl.$^2$ ............................... C10M 1/32
[58] Field of Search ........ 252/51.5 A, 56 R, 51.5 R

[56] References Cited

UNITED STATES PATENTS

| | | | |
|---|---|---|---|
| 2,965,571 | 12/1960 | Wuellner et al. | 252/51.5 A X |
| 3,088,931 | 5/1963 | Scanley et al. | 252/51.5 A X |
| 3,278,437 | 10/1966 | Lorensen et al. | 252/51.5 A |
| 3,404,091 | 10/1968 | Takashima et al. | 252/56 R X |
| 3,687,849 | 8/1972 | Abbott | 252/51.5 A X |
| 3,761,458 | 9/1973 | Holler et al. | 252/51.5 A X |
| 3,785,980 | 1/1974 | Wilgus | 252/51.5 R X |
| 3,842,010 | 10/1974 | Pappas et al. | 252/51.5 R |
| 3,879,304 | 4/1975 | Waldbillig | 252/51.5 A |

*Primary Examiner*—Delbert E. Gantz
*Assistant Examiner*—Andrew H. Metz
*Attorney, Agent, or Firm*—Thomas H. Whaley; Carl G. Ries; Walter D. Hunter

[57] ABSTRACT

Lubricating compositions exhibiting an improved viscosity index are prepared by adding to a lubricating oil base stock a small amount of graft copolymer of a methacrylate ester and an ethylene/propylene/alkylidene norbornene terpolymer.

15 Claims, No Drawings

LUBRICATING COMPOSITIONS CONTAINING METHACRYLATE ESTER GRAFT COPOLYMERS AS USEFUL VISCOSITY INDEX IMPROVERS

BACKGROUND OF THE INVENTION

This invention relates to lubricating compositions comprising a small amount of an oil-soluble graft copolymer of a methylacrylate ester and an ethylene-propylene-alkylidene norbornene terpolymer. More particularly this invention relates to lubricating oils having an improved viscosity index which comprise a lubricating oil base stock having incorporated therein a small amount of an oil-soluble graft copolymer of a methacrylate ester and an ethylene-propylene-alkylidene norbornene terpolymer.

DESCRIPTION OF THE PRIOR ART

The rate of change of viscosity of lubricating oil with temperature is called the viscosity index or V. I. Oils having a high viscosity index exhibit a smaller change in viscosity with temperature variation than those with a low V. I. In such applications as automobile and aircraft engine lubrications, where a wide range of temperature is encountered, lubricating oils having high viscosity indices are highly desirable and often critically necessary.

It is known that small quantities of long chain polymers of such hydrocarbons as isobutylene and similar aliphatic hydrocarbons, also acrylates and methacrylates esters will substantially increase the V. I. of petroleum lubricants. In particular, homopolymers and copolymers of methacrylic acid esters have been used extensively as "V. I. improvers". These polymeric additives are usually prepared by the free radical polymerization of a monomer or a mixture of monomers. Polymers and copolymers of such esters as butyl methacrylate, hexyl methacrylate, dodecyl methacrylate and octadecyl methacrylate have been prepared by this method. Polymers of the lower alkyl methacrylates are generally good viscosity index improvers but are relatively insoluble in oil; the higher alkyl esters produce polymers which are more oilsoluble but are generally inferior V. I. improvers. A copolymer of a lower alkyl methacrylate and a higher alkyl methacrylate will combine the desirable properties of its constituents, one portion providing the necessary oil solubility and the other contributing V. I. improvement to the oil. Copolymers with these dual properties are utilized extensively as V. I. improvers in lubricating oil.

Attempts to prepare copolymer compositions of such lower alkyl or cycloalkyl methacrylates as isopropyl methacrylate, one of the higher alkyl esters, for use as oil additives have been extremely difficult. Bulk polymerization invariably results in gel formation. The copolymers prepared by free radical polymerization in dilute solution become extensively cross-linked while purifying the isolated solid polymer with chloroform.

One of the objects of this invention is to provide lubricating oils having improved viscosity indices by incorporating in a lubricating base oil a small amount of a graft copolymer. Other objects and advantages will become apparent from the following description thereof.

BRIEF DESCRIPTION OF THE INVENTION

The lubricating compositions of this invention comprise a major portion of a hydrocarbon lubricating oil and a minor portion sufficient to improve the viscosity index of said oil of a graft copolymer prepared by (1) first reacting, an ethylene/propylene/alkylidene norbornene terpolymer with dinitrogen tetroxide to form a nitrated backbone polymer having incorporated therein nitro and nitrite functions which serve, in the second stage of the process, as sites for the subsequent graft copolymerization of an acrylate monomer or a mixture of acrylate monomers or (2) by first reacting an ethylene/propylene/alkylidene norbornene terpolymer, with a mixture of dinitrogen tetroxide and oxygen to form a nitrooxidized backbone polymer having incorporated therein nitro and peroxy nitrate functions which serve, in the second stage of the process, as sites for the subsequent graft polymerization of an acrylate monomer or a mixture of acrylate monomers.

DETAILED DESCRIPTION OF THE INVENTION

This invention relates to lubricating compositions comprising a major portion of a hydrocarbon lubricating oil and a minor portion sufficient to improve the viscosity index of the said oil of a graft copolymer prepared by:

A. contacting an ethylene/propylene/5-alkylidene-2-norbornene backbone terpolymer wherein the alkylidene group has from 1 to 16 carbon atoms with dinitrogen tetroxide to form a nitrated intermediate backbone polymer product having incorporated therein nitro and nitrite groups, (i.e., —ONO) and B. reacting the said intermediate backbone polymer product with an acrylate of the formula:

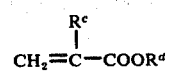

wherein $R^c$ is selected from the group consisting of hydrogen and alkyl of from 1 to 3 inclusive carbon atoms and $R^d$ is alkyl of from 1 to 30 inclusive carbon atoms.

In another embodiment this invention relates to lubricating compositions comprising a major portion of a hydrocarbon lubricating oil and a minor portion sufficient to improve the viscosity index of the said oil of a graft copolymer prepared by:

A. contacting an ethylene/propylene/5-alkylidene-2-norbornene backbone terpolymer, wherein the said alkylidene group has from 1 to 16 carbon atoms, with a mixture of dinitrogen tetroxide and oxygen to form an intermediate backbone polymer product having incorporated therein nitro and peroxy nitrate groups, and B. reacting the said intermediate backbone polymer product with an acrylate of the formula:

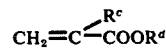

wherein R is selected from the group consisting of hydrogen and alkyl of from 1 to 3 inclusive carbon atoms and $R^d$ is alkyl of from 1 to 30 inclusive carbon atoms.

A wide variety of lubricating oils can be utilized in preparing the lubricating oil compositions of this invention including any natural or synthetic material having lubricating properties. For example, the base may be a hydrocarbon oil of wide viscosity range; e.g. 100 SUS at 100° F to 150 SUS at 210° F. Hydrocarbon oils blended with synthetic lubricants such as polymerized olefins, organic esters of poly-basic organic and inorganic acids, e.g. polyalkyl silicones, etc. may also be used.

Mineral oils are especially valuable for use in the compositions of this invention. Typical properties of refined mineral lubricating oil are set out below:

| Gravity, ° API | 26.5 |
| --- | --- |
| Pour Point ° F | 10 |
| Flash, COC, ° F | 390 |
| Viscosity, SUS at 100° F | 120–160 |
| Viscosity Index | 95. |

It is understood that the lubricating compositions of this invention can contain numerous additives conventionally used to improve the properties of the lubricating oils. Commonly employed additives are dispersants used to disperse sludge; pour point depressants; oxidation inhibitors such as alkyl phenols; detergents such as alkaline earth metal salts of petroleum sulfonates or alkaryl sulfonates; corrosion inhibitors such as dialkyl dithiophosphates; anti-foam fluids such as silicones, extreme pressure additives, etc.

THE NITRATION PROCESS FOR PREPARING THE GRAFT COPOLYMERS

The viscosity index improvers of this invention i.e., the oil soluble graft copolymers of a methacrylate are prepared by either of the two methods set out below.

In the first method, i.e., the nitration process, in the first stage reaction, the backbone polymer is contacted with dinitrogen tetroxide (sometimes after prepurging the reaction system with an inert gas, such as nitrogen, to remove oxygen) to form a nitrated intermediate polymeric product containing both nitro and nitrite functions. The exact structure of the nitrated intermediate polymeric product formed in the first stage is not known; however, in the resulting product the nitro and nitrite groups form on either olefinic carbon when both of the latter have the same number of hydrogen atoms attached, and when the olefin group is terminal, the nitro group attaches itself to the terminal olefinic carbon. Further, it is known that in a substantial number of the recurring units of the backbone polymer a nitro group adds on to each of the olefinic carbon atoms.

The intermediate polymeric compound, i.e., the nitrated backbone polymer formed in the first stage of the process of this invention when dinitrogen tetroxide is reacted with a terpolymer having for example, methylene-2-norbornene units, yield intermediate polymeric products believed to contain units of the formula:

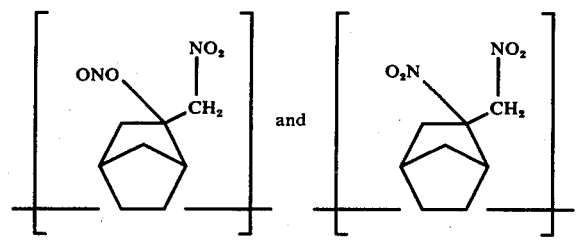

The reaction temperature employed is advantageously between −30° and 20° C. Higher reaction temperatures tend to facilitate the decomposition of the nitrated product and at temperatures below the prescribed range the dinitrogen tetroxide will not function due to its inability to disassociate into monomeric nitrogen dioxide.

The amount of dinitrogen tetroxide utilized in the first stage which can be varied over a wide range generally will be from about 0.00001 to 0.01 mole per gram of the backbone polymer charged to the reactor: the actual amount employed depends on the C=C equivalents/grams of backbone polymer desired to be reacted. The dinitrogen tetroxide may be introduced into the reactor in liquid form although preferably it is added as a gas and usually in admixture with an inert gas such as nitrogen, argon, etc. The reaction time is normally between about ½ and 10 hours although longer or shorter periods may be employed.

It is to be noted that the nitrating agent, dinitrogen tetroxide, is actually an equilibrium mixture of dinitrogen tetroxide and nitrogen dioxide with the equilibrium being driven to essentially 100% nitrogen dioxide at 140° C. Under advantageous conditions, the nitrating agent is normally introduced into the reaction system at a rate of between about 0.002 and 0.2 gram/min/gram of backbone polymer, however, the actual rate depends in large measure upon the rate of heat removal from the reaction system. To promote contact of the reactants in the first stage, the reaction is desirably carried out under conditions of agitation in the presence of an inert liquid diluent, for example, inert liquids having a boiling point between about 30° and 100° C, such as n-hexane, n-heptane, carbon tetrachloride and diethyl ether.

Terpolymer of the 5-alkylidene-2-norbornenes are highly useful as backbone polymers in preparing the viscosity improvers of this invention by both the nitration and nitrooxidation processes. These polymeric materials are copolymers of ethylene, propylene, and 5-alkylidene-2-norbornene, the said terpolymer having an iodine number between 2 and 60 and containing by weight of about 20 to 76.4 propylene, and about 3.6 to 20 percent 5-alkylidene-2-norbornene monomer units.

Representative examples of such terpolymers include: ethylene/propylene/5-methylidene-2-norbornene; ethylene/propylene/5-ethylidene-2-norbornene; ethylene/propylene/5-isobutylidene-2-norbornene; ethylene/propylene/5-n-heptylidene-2-norbornene; ethylene/propylene/5-isoheptylidene-2-norbornene; ethylene/propylene/5-n-decylidene-2-norbornene- ethylene/propylene/5-n-dodecylidene-2-norbornene; ethylene/propylene/5-n-tridecylidene-2-norbornene; ethylene/propylene/1-5-n-tetradecylidene-2-norbornene and ethylene/propylene/5-hexadecylidene-2-norbornene. Mixtures of the terpolymers may be used, if desired.

Preparation of the above-described terpolymers can be accomplished as set forth in U.S. Pat. No. 3,151,173 by contacting ethylene, at least one alpha-olefin, and at least one 5-alkylidene-2-norbornene in solution in inert solvents with coordination catalysts, at temperatures between −20° and 70° C at atmospheric, subatmospheric, or superatmospheric pressure and in the absence of catalyst poisons such as oxygen, water, and carbon dioxide.

In the second stage, the grafting of acrylate monomer takes place at the site of nitrite (—ONO) attachment through the mechanism of a free radical polymerization. The nitrated intermediate polymer product formed in the first stage thus provides not only the sites for the graft polymerization but also the free radicals necessary to initiate the polymerization of the acrylate monomer.

After the first stage reaction has been completed and the unsaturated polymer having nitro and nitrite groups incorporated therein has been formed, and if the system previously had not been placed under an inert atmosphere an inert purge gas such as nitrogen, preferably, is passed through the reaction mixture and continued until any oxygen has been removed. The acrylate monomer, which may be dissolved in an inert solvent such as ether, n-hexane or benzene, etc. if desired, is then added to the polymer solution after the monomer or its solution has been purged with an inert gas. Acrylate monomers useful in preparing the oilsoluble graft copolymers by both of the processes set forth, i.e., nitration and nitrooxidation have the formula:

$$CH_2=\underset{\underset{R^c}{|}}{C}-COOR^d,$$

wherein $R^c$ is hydrogen or alkyl of from 1 to 3 inclusive carbon atoms as exemplified by methyl, ethyl, propyl and isomers thereof, and $R^d$ is alkyl of from 1 to 30 inclusive carbon atoms as exemplified by methyl, ethyl, propyl, butyl, pentyl, hexyl, octyl, nonyl, decyl, undecyl hexadecyl, heptadecyl, octadecyl, nonadecyl, eicosyl, docosyl, pentacosyl, and isomers thereof. Mixtures of these acrylates may be employed, if desired.

In the second stage, in which graft copolymerization takes place, the reaction mixture is heated to decompose the nitrite sites in the backbone polymer. Generally the reaction mixture is heated to a temperature of from about 35° to about 175° C and, preferably, at a temperature of about 80° to about 130° C. The second stage reaction may be conducted under refluxing conditions. Heating is continued until the desired degree of graft polymerization has been accomplished. The course of the reaction can be followed by measurement, for example, of the refractive index of the mixture or by determining some other easily measurable physical property.

The extent of the grafting achieved is directly dependent on the extent of the nitrite formation. One skilled in the art can prepare the desired graft copolymer by carefully selecting the necessary reaction conditions, such as time, temperature, etc. in the first and second stages of the process of this invention.

Recovery of the product from the reaction mixture can be accomplished by a variety of methods well known in the art such as by the addition of methanol or acetone to precipitate the product which can be recovered by decantation, centrifugation, filtration, etc. and the crude polymer can be redissolved in a suitable solvent such as chloroform, benzene or toluene, etc. and reprecipitated in purified form by addition of methanol or acetone to the polymer solution.

A relatively small amount of dinitrogen tetroxide should be used in the first stages when backbone polymers of the ethylene/propylene/5-ethylidene-2-norbenzene type is employed (i.e. about 0.00001 to about 0.001 mole of dinitrogen tetroxide/g of polymer or less.

The backbone polymers utilized in forming the novel graft copolymers by the nitration and nitrooxidation processes generally will have molecular weights of from about 5000 to about 200,000 or more and, preferably, from about 10,000 to about 150,000. The final graft copolymer products will have molecular weights of from about 6500 to about 1,000,000 or more and, preferably, from about 15,000 to about 250,000.

Generally, the backbone polymer will make up about 5 to about 80 or higher and, preferably, from about 10 to about 40 percent by weight of the final graft copolymer, the balance being furnished by the monomer which is grafted and polymerized onto the nitrated backbone polymer.

The preparation of the oil-soluble graft copolymers of a methacrylate ester and an ethylene/propylene/diene terpolymer by the nitration method is more fully described in U.S. Pat. No. 3,751,522, which is incorporated herein in its entirety.

The following examples illustrate the preparation of various oil-soluble graft copolymers of a methacrylate ester and an ethylene/propylene/alkylidene norbornene terpolymer.

EXAMPLE I

Graft Copolymer of Butyl Methacrylate on Nitrated Ethylene/Propylene/5-Ethylidene-2-Norbornene Terpolymer Into a resin kettle equipped with a reflux condenser, a thermometer, a mechanical stirrer, and a gas inlet tube were placed 5.0 g of an ethylene/propylene/5-ethylidene-2-norbornene terpolymer marketed by Copolymer Rubber and Chemical Corporation under the trademark EPsyn 40-A (molecular weight 76,000, raw Mooney viscosity (ML-8' at 250° F) 40, specifically gravity 0.86, gel content-none) and n-heptane (160 ml). The mixture was stirred at room temperature until the the polymer dissolved following which the solution was cooled to the temperature of an ice bath. The gas inlet tube was connected to a graduated container of liquid dinitrogen tetroxide; a stream of nitrogen (at a rate of 60.8 ml/min (STP)) was passed over the dinitrogen tetroxide and the resultant gaseous mixture ($N_2O_4/N_2$) was conducted into the reaction solution (at ice bath temperature) through the gas inlet tube. One-tenth milliliter of liquid dinitrogen tetroxide was transferred to the reaction solution in this manner over a period of 47 min. Unreacted dinitrogen tetroxide was purged from the reaction solution with a stream of nitrogen. Butyl methacrylate (50 ml) was added to the reaction solution and approximately 90 ml of solvent was stripped off under vacuum to concentrate the reactants. The reaction solution was subsequently heated at about 60 and 80° C for 2 and 4 hrs. respectively. After dilution with benzene (100 ml) to lower the viscosity and after methanol (400 ml) was added, the graft copolymer product precipitated from the solution. To the resulting mixture there was added 1500 ml of additional methanol with mixing following which the graft copolymer was separated by decantation. The product was dissolved in 200 ml of benzene and reprecipitated by addition of 1000 ml of methanol (to remove unreacted monomer) and afterwards dried in vacuo. The weight of the dry polymer was 18.1 g.

A sample of a graft copolymer product prepared with EPsyn 40-A and butyl methacrylate in the same manner as in Example I (0.810 g), calculated to contain 0.25 g. of EPsyn 40-A, was dissolved in benzene (30 ml). Acetone (90 ml) was slowly added to this solution resulting in precipitation of an acetone-insoluble fraction amounting to 0.103 g. A similar procedure with 0.250 g of EPsyn 40-A resulted in precipitation of 0.228 g. In addition, an infrared spectrum of the acetone-insoluble fraction of the product indicated that it contained an appreciable amount of poly (butyl methacrylate) which as a homopolymer is acetone-soluble. These tests indicate that a true graft copolymer had been prepared.

EXAMPLE II–VIII

A number of additional graft polymerization runs were conducted in the same manner as described in Example I above. Pertinent details relating to these examples are presented in Table 1.

TABLE 1

Graft Copolymerization with Nitrated Ethylene/Propylene/5-Ethylidene-2-Norbornene Terpolymer[a]

| Example No. | Methacrylate Ester (ml) | Solvent (Ml.) | Temp. (°C)/ Time (hr.) | Polymer Weight Increase Percent |
|---|---|---|---|---|
| IIhu b | Methyl (100) | Hexane (70) | 60/4.5 | 744 |
| III[b] | Methyl (100) | Hexane (70) | Room Temp/ 30.5 | 1172 |
| IV[b] | Butyl (100) | Hexane (100) | 75/5 | 312 |
| V[b] | Lauryl (100) | Hexane (100) | 80/7 | 400 |
| VI[b] | Methyl (100) | Hexane (70) | 60/4.5 | 620 |
| VII[b] | Methyl (100) | Hexane (60) | 60/3.1 | 160 |
| VIII[c] | Butyl (150) | Hexane (160) | 60/2; 80/4 | 262 |

[a]In preparing the nitrated terpolymer 0.1 ml (liquid) dinitrogen tetroxide was slowly transferred as a gas mixed with nitrogen into a solution of 5.0 g. of the backbone polymer.
[b]Backbone terpolymer, an ethylene/propylene/5-ethylidene-2-norbornene terpolymer marketed by Copolymer Rubber and Chemical Corporation under the tradename EPsyn 55, molecular weight about 90,600 raw Mooney viscosity (ML-8' at 250° F) 55, specific gravity 0.86, gel content-none).
[c]Backbone terpolymer - EPsyn 40-A (See Example II for description).

EXAMPLES IX–XI

In this series the grafting of butyl methacrylate, lauryl methacrylate and a mixture of lauryl methacrylate, and butyl methacrylate respectively, to an ethylene/propylene/5-ethylidene-2-norbornene terpolymer having a molecular weight of about 76,000 (EPsyn 40-A) was demonstrated. The nitration step (first stage reaction) was conducted by stirring a solution of the polymer (9.4 weight percent in heptane) with dinitrogen tetroxide (about $4.0 \times 10^{-4}$ mole per gram of polymer) for three hours at 0–5° C under a nitrogen atmosphere. The acrylate monomer, which had been purged with nitrogen, was added to the reaction solution; the resultant mixture was heated to bring about the second stage polymerization and graft reaction. Recovery of the graft copolymer was accomplished by adding methanol to the reaction mixture to precipitate the graft copolymer which was purified by dissolution in benzene and re-precipitation with methanol. Other pertinent details relating to these three examples are found in Table 2.

TABLE 2

METHACRYLATE GRAFT COPOLYMERS
Graft Conditions

| Run No. | Monomer[1] | Temp (°C) | Time (hr) | Conversion (Percent) | Polymer Weight Increase Percent |
|---|---|---|---|---|---|
| IX | BMA | 100 | 7 | 12.2 | 110 |
| X | LMA | 100 | 7 | 7.5 | 66 |
| XI | LMA-BMA[2] | 80 | 5 | 7.1 | 63 |

[1]BMA and LMA stand for butyl and lauryl methacrylate respectively.
[2]LMA-BMA molar ratio of 1.47:1.

EXAMPLE XII

Into a resin kettle equipped with mechanical stirrer, thermocouple well, gas inlet tube, and reflux condenser were placed EPsyn 55 (a commercially available ethylene-propylene-ethylenenorbornene terpolymer of molecular weight 91,000) (5.0 g.) and n-hexane (160 ml.). The polymer was allowed to dissolve, the system was placed under nitrogen, and the solution was cooled to 0° C., and 0.1 ml. of $N_2O_4$ (liquid measure) was transferred to the solution. After 5 minutes, 50 ml. of lauryl methacrylate was added to the solution. Approximately 60 ml. of solvent was stripped from the solution with vacuum and an additional 50 ml. of lauryl methacrylate was added. The solution was heated at 60° C for 6.5 hours. The graft copolymer product (13.8 g., after drying in vacuo) was precipitated from the solution by addition of methanol (1200 m.).

THE NITROOXIDATION PROCESS FOR PREPARING THE GRAFT COPOLYMER

In the second method for preparing the oil-soluble graft copolymers useful as viscosity index improvers of this invention in the first stage reaction, the backbone polymer is contacted simultaneously with a mixture of dinitrogen tetroxide and oxygen to form an intermediate polymeric product containing both nitro and peroxy nitrate functions. It is to be noted that the nitro and peroxy nitrate groups form on either olefinic carbon when both of the latter have the same number of hydrogens attached and the intermediate product is actually a mixture of compounds. When the olefin group is terminal, the nitro group attaches itself to the terminal olefinic carbon.

The intermediate polymeric compound, i.e., the nitrooxidized backbone polymer, formed in the first stage of the nitrooxidation process when a mixture of dinitrogen tetroxide and oxygen is reacted with a backbone polymer having, for example, recurring 5-methylene-2-norbornene units yields an intermediate product containing units of the formula:

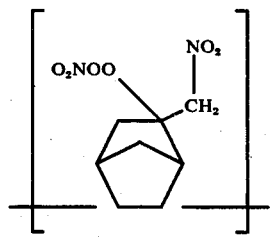

The reaction temperature employed is advantageously between about −30° and 20° C. Higher reaction temperatures tend to facilitate the decomposition of the peroxy nitrate product and at temperatures below the prescribed range the dinitrogen tetroxide would not function due to its inability to disassociate into monomeric nitrogen dioxide.

The amount of dinitrogen tetroxide employed in the first stage which can be varied over a wide range generally will be from about 0.00001 to about 0.01 mole per gram of the backbone polymer charged to the reactor; the actual amount employed depends on the C=C equivalents/gram of backbone polymer desired to be reacted. The reactant mole ratio of dinitrogen tetroxide to oxygen utilized is normally between about 0.5:1 and 0.005:1. However, the important aspect of the reactant ratio of this mixture is that the moles of oxygen be at least equivalent and preferably in excess to the moles of dinitrogen tetroxide. If the ratio of $N_2O_4$ is above that of oxygen another $NO_2$ group forms rather than the desired peroxy group. Excess oxygen even in excess of the stated range does not deleteriously affect the reaction.

The oxygen employed may be in the pure form or in the diluted form such as air or in admixture with inert gases such as nitrogen and argon. Under advantageous conditions the oxygen is introduced into the reaction system at a rate of between about 0.1 and 100 mls. (STP)/min/gram of backbone polymer. The reaction time is normally between about ½ and 10 hours although longer or shorter periods may be employed.

It is to be noted that the nitrating agent, dinitrogen tetroxide, is actually an equilibrium mixture of dinitrogen tetroxide and nitrogen dioxide with the equilibrium being driven to essentially 100% nitrogen dioxide at 140° C. Under advantageous conditions, the nitrating agent is normally introduced into the reaction system at a rate of between about 0.002 and 0.2 gram/min/gram of backbone polymer; however, the actual rate depends in large measure upon the rate of heat removal from the reaction system.

To promote contact of the reactants in the first stage, the reaction is desirably carried out under conditions of agitation in the presence of an inert liquid diluent, for example, inert liquids having a boiling point between about 30° and 100° C such as n-hexane, n-heptane, carbon tetrachloride and diethylether.

Terpolymers of ethylene/propylene/alkylidene-2-norbornenes are highly useful as backbone polymers in the process of this invention. Suitable terpolymers of this type have been described in detail above.

In the second stage of the nitrooxidation process the grafting of an acrylate monomer takes place at the peroxy nitrate sites through the mechanism of a free radical polymerization. The intermediate polymer product formed in the first stage thus provides not only the sites for the graft polymerization but also the free radicals necessary to initiate the polymerization of the acrylate monomer.

After the first stage reaction has been completed and the unsaturated polymer having nitro and peroxy nitrate groups incorporated therein has been formed, an inert purge gas such as nitrogen is passed through the reaction mixture and continued until any dissolved oxygen has been removed. The acrylate monomer, which may be dissolved in an inert solvent such as ether, n-hexane or benzene, etc. if desired, is then added to the polymer solution either before or after the inert purge gas sweep is commenced.

In the second stage, in which apparently graft copolymerization takes place, the reaction mixture is heated to decompose the peroxy nitrate sites in the backbone polymer. Generally the reaction mixture is heated to a temperature of from about 35° to about 175° C and, preferably, at a temperature of about 80° to about 130° C. The second stage reaction may be conducted under refluxing conditions. Heating is continued until the desired degree of graft polymerization has been accomplished. The course of the reaction can be followed by measurement, for example, of the refractive index of the mixture or by determining some other easily measurable physical property.

The extent of the grafting achieved is directly dependent on the extent of the peroxy nitrate formation. One skilled in the art can prepare the desired graft copolymer by carefully selected the necessary reaction conditions, such as time, temperature, etc. in the first and second stages of the process of this invention.

Recovery of the product from the reaction mixture in the nitrooxidation process can be accomplished by a variety of methods well known in the art as by the addition of methanol or acetone to precipitate the product which can be recovered by decantation, centrifugation, filtration, etc. or the crude polymer can be redissolved in a suitable solvent such as chloroform, benzene or toluene, etc. and re-precipitated in purified form by addition of methanol or acetone to the polymer situation. Fractional precipitation may be utilized to identify the final polymer as a true graft polymer of the backbone polymer and the acrylate.

A relatively small amount of dinitrogen tetroxide should be used in the first stage when backbone polymers of the ethylene/propylene/5-ethylidene-2-norbornene type is employed (i.e., about 0.00001 to about 0.001 mole of $N_2O_4$ per g. of polymer or less). Also, it has been found advantageous to add the acrylate within about 1 to about 10 minutes after the nitrogen tetroxide first stage reaction has been completed.

EXAMPLE XIII

Graft Copolymer of Butyl Methacrylate on an Ethylene/Propylene/5-Ethylidene-2-Norbornene Terpolymer Into a resin kettle equipped with a reflux condenser, a thermometer, a mechanical stirrer, and a gas inlet tube were placed 5.0 g. of ethylene/propylene/5-ethylidene-2-norbornene terpolymer marketed by Copolymer Rubber and Chemical Corporation under the trademark EPsyn 40-A (molecular weight 76,000, raw Mooney viscosity (ML 8' at 250° F) 40, specific gravity 0.86, gel content-none) and 70 ml of n-heptane.

The mixture was stirred at room temperature until polymer dissolved, following which the solution was cooled to ice bath temperature while purging it with oxygen (2 hrs) Gaseous dinitrogen tetroxide (15.0 ml-STP) was injected into the solution with a hypodermic syringe and after stirring for 5 minutes, the oxygen in the system was replaced with nitrogen by evacuating the system and refilling it with nitrogen four times. Butyl methacrylate (50 ml.) was added to the reaction solution (13 mins. after the addition of the dinitrogen tetroxide). The solution was subsequently heated at 80° C for 5 hours, after which it was diluted with benzene (100 ml.) to decrease the viscosity of the solution. Methanol (400 ml.) was added dropwise causing the graft copolymer formed to precipitate. The mixture was stirred with an additional 1500 ml. of methanol and the polymeric product was separated. The product was dissolved in benzene (200 ml) and re-precipitated by addition of 1000 ml. of methanol in order to remove unreacted monomer and finally dried in vacuo. The weight of the graft copolymer recovered was 14.7 g.

A sample of the product (0.735 g), calculated to contain 0.25 g. of the initial terpolymer was dissolved in benzene (30 ml.). Acetone (90 ml.) was slowly added to this solution, resulting in precipitation of an acetone-insoluble fraction amounting to 0.096 g. A similar procedure with 0.250 g. of the initial terpolymer resulted in precipitation of 0.228 g. In addition, by infrared analysis it was shown that the acetone-insoluble fraction of the product contained an appreciable amount of polybutyl methacrylate which as a homopolymer is acetone-soluble.

EXAMPLE XIV-XVII

A number of additional runs were conducted in the same manner as described in Example XIII above. Pertinent details relating to these examples are presented in Table 3.

TABLE 3
NITROOXIDATION OF POLYMERS AND GRAFT REACTIONS

| Example | Polymer(g) | Solvent(ml) | Vol. Liq. $N_2O_4$ ml[a] | Graft Reaction[b] Monomer(ml) | Temp.(° C)/Time(hr) | Prod. (g) |
|---|---|---|---|---|---|---|
| XIV | EPsyn 55[d](5.0) | Toluene (160) | 0.1 | MMA[c] (30) | RT/16.3  60/7 | 7.1 |
| | A 5 ml sample of reaction solution taken at commencement of 60° C heating yielded 0.15 g. of polymer. | | | | | |
| XV | EPsyn 40-A[e](5.0) | Toluene (160) | 0.1 | MMA[c] (3) | | 7.0 |
| | Reaction solution began to gel within 1 min. of MMA addition and 50 ml. of benzene was added | | | | | |
| XVI | EPsyn 40-A[e] (5.0) | n-Heptane (70) | 15 (gas) | BMA[f] (50) | 80/5 | 12.6 |
| | Lubrizol 817 (0.05 g) was added to polymer solution (200 ml. benzene) prior to last precipitation used to inhibit crosslinking on standing. | | | | | |
| XVII | EPsyn 40-A[e] (5.0) | n-Heptane (70) | 15 (gas) | BMA[f] (50) | 90/5 | 16.9 |
| | 0.05 g. of Lubrizol 817 added as in Example XII. | | | | | |

[a]$N_2O_4$ slowly transferred to reaction solution at 0° C using $O_2$ as carrier gas.
[b]Graft reaction carried out under $N_2$ and after $O_3$ in system was replaced with $N_2$.
[c]Methyl methacrylate.
[d]See Example II for description of EPsyn 55.
[e]See Example I for description of EPsyn 40-A.
[f]Butyl methacrylate.

EXAMPLES XVIII–XX

In this series the grafting of butyl methacrylate, lauryl methacrylate and a mixture of lauryl methacrylate and butyl methacrylate, respectively, to an ethylene/propylene/5-ethylidene-2-norbornene terpolymer having a molecular weight of about 76,000 (EPsyn 40-A) was demonstrated. The nitrooxidation step (first stage reaction) was conducted by stirring a solution of the polymer (9.4 weight percent in heptane) and dinitrogen tetroxide (about $1.0 \times 10^{-4}$ mole per gram of polymer) for five minutes at 0°–5° under an oxygen atmosphere. The acrylate monomer (10 ml/g polymer) was added to the reaction solution, the system was placed under a nitrogen atmosphere and heated to bring about the second stage polymerization and graft reaction. Recovery of the graft copolymer was accomplished by adding methanol to the reaction mixture to precipitate the graft copolymer which was purified by dissolution in benzene and re-precipitation with methanol. Other pertinent details relating to these three examples are found in Table 4.

TABLE 4
METHACRYLATE GRAFT COPOLYMERS

| Ex. | Monomer[1] | Graft Conditions Temp (° C) | Time (hr) | Monomer Conversion (Percent) | Polymer Weight Increase (Percent) |
|---|---|---|---|---|---|
| XVIII | BMA | 100 | 7 | 34.0 | 306 |
| XIX | LMA | 100 | 7 | 45.0 | 400 |
| XX | LMA-BMA[2] | 80 | 5 | 20.0 | 180 |

[1]BMA and LMA stand for butyl and lauryl methacrylates, respectively.
[2]LMA-BMA molar ratio of 1.47:1.

EXAMPLE XXI

The procedure for this example of the nitrooxidaand graft reactions of EPsyn 40-A (an ethylene-propylenedene-2-norbornene terpolymer of molecular weight 76,000) was similar to the above Example XII for nitration and graft of EPsyn 55 except that the run was made in n-decane (70 ml.; not stripped) and the system was placed under oxygen prior to addition of $N_2O_4$ (15 ml. gaseous meaure). After addition of lauryl methacrylate (50 ml.), the system was placed under nitrogen and the solution was heated at 120° C for 7 hours. n-Decane (25 ml.) was added after 35 minutes at 120° C. to reduce viscosity. The product (34.5 g., after drying in vacuo) was precipitated by addition of 400 ml. of methanol.

PREPARATION OF LUBRICATING COMPOSITIONS

The amount of the oil-soluble graft copolymer viscosity index improver added to the lubricating oil base stock to form lubricating oil compositions of this invention can be varied over a wide range depending on the particular lubricating oil base stock employed and the viscosity characteristics desired in the final oil composition. Generally, the amount of the oil-soluble graft copolymers utilized will be from about 0.1 to about 2.5 weight percent or more and preferably will be from about 0.5 to about 2.0 weight percent.

In adding the graft copolymer to the lubricating oil base, the copolymer can, for example, first be dissolved in a suitable solvent such as benzene, toluene, hexane, heptane, etc. to form a solution of about 10 to about 20 weight percent of the copolymer in the solvent. The thus-prepared copolymer solution can be added to the lubricating oil base stock with mixing at a temperature of from about 50° F to about 150° F.

LUBRICATING OIL COMPOSITIONS A–H

A number of lubricating oil compositions were prepared by dissolving in Solvent Neutral Oil graft copolymers prepared by either the nitration or nitrooxidation methods previously described in benzene. After the required amount of copolymer had been added to the lubricating oil base stock, (i.e., the Solvent Neutral Oil) the benzene was stripped from the solution with a rotary evaporator. Graft copolymer of Example V was employed in Composition G and the graft copolymer of Example XXI was utilized in Composition F. The graft copolymers employed in Compositions A through E were prepared by the nitrooxidation process in the same manner as the graft copolymer used in Composition F while the graft copolymer of Composition H was prepared by the nitration process in the same manner as the graft copolymer utilized in Composition G.

The substantial improvement in viscosity index (i.e., VI) achieved when the graft copolymers prepared as previously described were incorporated in Solvent Neutral Oil and other pertinent test data relating to Compositions A-H is set out in Table 5. For example, the VI of Solvent Neutral Oil is 90 whereas the VI of Composition C is 198 and the VI of Composition H is 180. Additionally, as shown in Table 5, the pour points of a number of the compositions set forth in Table 5 are lower than that of the base lubricating oil stock.

TABLE 5

| Solution Properties of Graft Copolymers | | | | | |
|---|---|---|---|---|---|
| Lubricating Oil Composition | A | B | C | D | E |
| Graft Copolymer Backbone | E-P-ENB[1] → | | EPsyn 40-A[2] → | | |
| Graft Copolymer Make-up | Backbone/IMA[4]/BMA[4] → | | | | Backbone/IMA[4]/MMA[4] |
| Weight ratio of Contents | 1:1.1:1.1 | 1:2.5:2.5 | 1:2.9:2.9 | 1:1.2:4.7 | 1:1.4:0.38 |
| Graft Reaction Procedure | Nitrooxidation → | | | | |
| Solution Properties | | | | | |
| Weight % Graft Copolymer in Solvent Neutral Oil | 1.5 | 1.5 | 1.5 | 1.5 | 0.80 |
| Viscosity at 100° F.,c ST | 30.7 | 39.0 | 52.1 | 39.8 | 52.4 |
| Viscosity at 210° F.,c ST | 5.37 | 7.63 | 10.11 | 7.83 | 9.00 |
| VI | 120 | 181 | 198 | 185 | 165 |
| Pour Point,° F | +5 | −5 | 0 | −5 | −15 |
| Cold Cranking Simulator Test at 0° F, cp | 979 | 1090 | 1100 | 1065 | — |
| Brookfield Vis. at −20° F,cp | 60,000 | — | — | 63,500 | — |

| Lubricating Oil Composition | F | G | H | Solvent Neutral Oil |
|---|---|---|---|---|
| Graft Copolymer Backbone | EPsyn 40-A[2] | EPsyn 55[3] | EPsyn 55[3] | |
| Graft Copolymer | Backbone/LMA[4] | Backbone/LMA[4] | Backbone/LMA[4] | |
| Weight Ratio of Contents | 1:5.9 | 1:4 | 1:1.8 | |
| Graft Reaction Procedure | Nitrooxication | Nitration | | |
| Solution Properties | | | | |
| Weight % Graft Copolymer in Solvent Neutral Oil | 1.5 | 1.5 | 1.5 | |
| Viscosity 100° F, c ST. | 54.7 | 54.3 | 103.7 | 27.0 |
| Viscosity 210° F, c ST. | 9.77 | 9.01 | 16.31 | 4.6 |
| VI | 178 | 158 | 180 | 90 |
| Pour Point, ° F | −35 | −25 | −25 | 0 |
| Cold Cracking Simulator Test 0° F, cp | 1070 | 983 | | |
| Brookfield Vis. at −20° F, cp | 23,200 | — | — | |

[1]E-P-ENB - an ethylene-propylene-5-ethylidene-2-norbornene terpolymer of molecular weight 11,600.
[2]EPsyn 40-A - commercially available ethylene-propylene-5-ethylidene-2-norbornene terpolymer of molecular weight 76,000.
[3]EPsyn 55 - a commercially available ethylene-propylene-5-ethylidene-2-norbornene terpolymer of molecular weight 91,000.
[4]LMA, BMA, and MMA - stand for lauryl, butyl, and methyl methylacrylates, respectively.

What is claimed is:
1. A lubricating composition comprising a major portion of a hydrocarbon lubricating oil and a minor portion sufficient to improve the viscosity index of said oil of a graft copolymer prepared by
   A. contacting an ethylene/propylene/5-alkylidene-2-norbornene backbone terpolymer wherein the alkylidene group has from 1 to 16 carbon atoms and wherein the terpolymer has a molecular weight of about 4,000 to about 200,000, with dinitrogen tetroxide at a temperature of from about −30° to about 20° C, wherein the amount of dinitrogen tetroxide introduced is from about 0.00001 to about 0.01 mole/g of the terpolymer, to form a intermediate backbone terpolymer product having incorporated therein nitro and nitrite groups on the olefinic carbon atoms of the 5-alkylidene-2-norborene units of the said terpolymer, and
   B. reacting said intermediate backbone terpolymer product at a temperature of from about 35° to about 175° C with an acrylate of the formula:

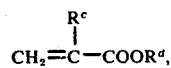

$$CH_2=\overset{R^c}{\underset{|}{C}}-COOR^d,$$

wherein $R^c$ is hydrogen or alkyl of from 1 to 3 inclusive carbon atoms and $R^d$ is alkyl of from 1 to 30 inclusive carbon atoms.

2. The lubricating composition of claim 1 wherein the said backbone terpolymer is a terpolymer of ethylene, propylene and 5-ethylidene-2-norbornene.

3. The lubricating composition of claim 1 wherein the molecular weight of the graft copolymer is about 6500 to about 1,000,000.

4. The lubricating composition of claim 1 wherein said acrylate utilized in (B) is lauryl methacrylate.

5. The lubricating composition of claim 1 wherein the said terpolymer utilized in (A) is ethylene/propylene/5-ethylidene-2-norbornene having a molecular weight of about 91,000 and the said acrylate utilized in (B) is lauryl methacrylate.

6. A lubricating composition comprising a major portion of a hydrocarbon lubricating oil and a minor portion sufficient to improve the viscosity index of said oil of a graft copolymer prepared by:
   A. contacting an ethylene/propylene/5-alkylidene-2-norbornene backbone terpolymer, wherein the alkylidene group has from 1 to 16 carbon atoms and wherein the terpolymer has a molecular weight of about 4,000 to about 200,000 with a mixture of dinitrogen tetroxide and oxygen at a temperature of from about −30° to about 20° C to form an intermediate backbone polymer product having incorporated therein nitro and peroxy nitrate groups on the olefinic carbon atoms of the 5-alkylidene-2-norbornene units of the said terpolymer, wherein the mole ratio of dinitrogen tetroxide to oxygen in the said mixture is from about 1:1 to about 0.05:1 and wherein the amount of dinitrogen tetroxide introduced is from about 0.00001 to about 0.01 mole/g of the backbone polymer, and B. reacting the said intermediate backbone polymer product at a temperature of from about 35° to about 175° C with an acrylate of the formula:

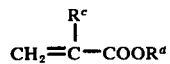

wherein $R^c$ is selected from the group consisting of hydrogen and alkyl of from 1 to 3 inclusive carbon atoms and $R^d$ is alkyl of from 1 to 30 inclusive carbon atoms.

7. The lubricating composition of claim 6 wherein the said backbone terpolymer is a terpolymer of ethylene, propylene and 5-ethylidene-2-norbornene.

8. The lubricating composition of claim 6 wherein the molecular weight of the graft copolymer is about 6500 to about 1,000,000.

9. The lubricating composition of claim 6 wherein the said acrylate utilized in (B) is lauryl methacrylate.

10. The lubricating composition of claim 6 wherein in (B) a mixture of butyl methacrylate and lauryl methacrylate is utilized.

11. The lubricating composition of claim 6 wherein in (B) a mixture of methyl methacrylate and lauryl methacrylate is utilized.

12. The lubricating composition of claim 6 wherein in (A) the terpolymer employed in ethylene/propylene/5-ethylidene-2-norbornene having a molecular weight of about 11,600 and in (B) a mixture of butyl methacrylate and lauryl methacrylate is utilized.

13. The lubricating composition of claim 6 wherein in (A) the terpolymer employed is ethylene/propylene/5-ethylidene-2-norbornene having a molecular weight of about 76,000 and in (B) a mixture of methyl methacrylate and lauryl methacrylate is utilized.

14. The lubricating composition of claim 1 wherein the said acrylate utilized in (B) is methyl methacrylate.

15. The lubricating composition of claim 6 wherein the said acrylate utilized in (B) is methyl methacrylate.

* * * * *